April 22, 1969 S. L. LEE 3,439,502
COOLING OF GAS GENERATORS
Filed Jan. 25, 1966
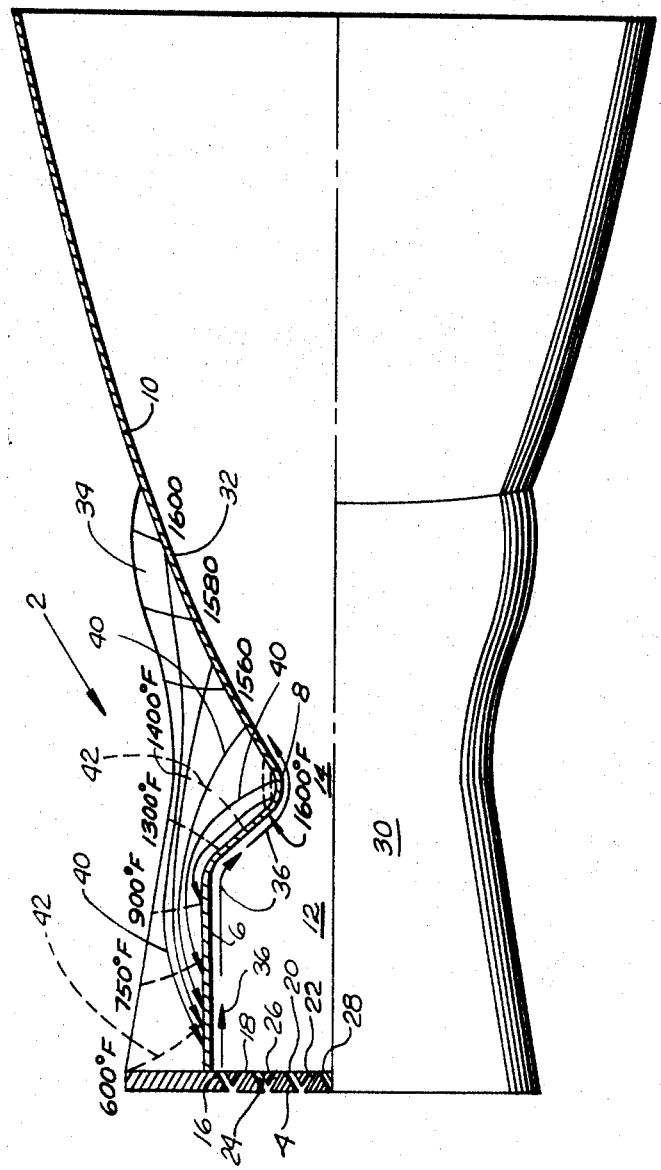
INVENTOR.
SEN L. LEE
BY Donald W. Draver
ATTORNEY 3,439,502
COOLING OF GAS GENERATORS
Sen L. Lee, Canoga Park, Calif., assignor to North American Rockwell Corporation, a corporation of Delaware
Filed Jan. 25, 1966, Ser. No. 522,937
Int. Cl. F02k 9/02, 11/02
U.S. Cl. 60—258     3 Claims

ABSTRACT OF THE DISCLOSURE

A primary cooling system for a rocket motor thrust chamber having its combustion chamber and throat portions constructed of material characterized by a high ratio of thermal conductivity to density, such as copper. The walls of the combustion chamber and throat are sufficiently thick so that when a film of coolant fluid is injected into the combustion chamber heat paths are formed within the interior of the walls, extending from the throat portion axially rearwardly to a region upstream of the throat portion. Heat absorbed by the throat is conducted along the heat paths to the upstream region which acts as a heat sink and dissipates the heat.

---

This invention relates to gas generators. More particularly, this invention relates to cooling of a gas generator such as a rocket engine.

In the use of rocket engines, a problem inherent during firing of the engine resides in cooling of the engine walls and other components. This problem exists for both short durations and long durations of firing. This cooling is a problem due to the high temperatures and pressures generated when the propellants undergo combustion. These propellants may be a fuel and oxidizer, whether liquid or solid, or mono-propellants which undergo decomposition. This heat can be dissipated only through the nozzle exit and/or through the nozzle walls and injector. When heat is conducted through the nozzle wall, the wall becomes very hot and structural integrity is threatened. To construct nozzle walls of typical engines in order to have the ability to withstand these high temperatures without other cooling, it is necessary to provide a wall which is too heavy or has other disadvantages. In addition, some heat may be transferred to components of the engine which cannot be exposed to high temperatures without harmful or destructive effects. For example, the propellant lines, controls and portions of the injector should avoid contact with high temperatures, particularly when cryogenic propellants are used. Heat dissipation, therefore, is a problem in the construction and use of high temperature gas generating devices.

One approach in the past has been to provide insulation, but this has proved generally unsatisfactory due to either unsatisfactory materials or inefficiency. For long duration firings, even the best of currently available insulation materials will break down.

One way of cooling a nozzle wall employed in most current state of the art gas generators is to pass coolant through the walls, which are typically constructed of tubes, and then inject the coolant, which is usually one of the propellants, into the combustion chamber. This approach suffers from complexity and the need for high pumping capacity in order to overcome the pressure drop encountered in traversing the coolant passages.

Another method of cooling is disclosed in U.S. patent application Ser. No. 266,445 filed on Mar. 19, 1963, and assigned to the assignee of this invention. This process, however, is usually limited to hydrogen fueled engines.

Still another method of cooling comprises the injection of coolant along the interior of the nozzle wall which provides a boundary layer between the combustion chamber gases and the nozzle wall. This is commonly termed "film cooling." Disadvantages of this process with conventional rocket engine nozzle wall materials include coolant boil-off. This is a phenomena which occurs due to too rapid heating of the boundary layer particularly in the throat region which results in too great a heat transfer in the throat region. This can be corrected by introduction of excess coolant, which is usually one of the propellants, but this is done only with a reduction of engine performance.

Radiation cooling is another approach. In this method a thin walled nozzle or thrust chamber is provided so that heat is dissipated quickly through the wall and radiated into space. Thin walled chambers are, however, structurally weak. In addition, any attempt at clustering these types of engines decreases the radiation capabilities since the hot radiating surfaces are in close juxtaposition.

With smaller engines, the usual manner of cooling resides in the use of ablative materials in the nozzle wall. These materials absorb heat by charring.

Another method is disclosed in U.S. Patent No. 3,067,594, in which an endothermic reaction is used to absorb heat.

Still another cooling approach for use with extremely high temperatures is disclosed in U.S. patent application Ser. No. 300,957,, filed on Aug. 5, 1963, and assigned to the assignee of this invention. This method comprises the spraying of molten lithium on a nozzle wall which is capable of absorbing large amounts of heat during the vaporization of lithium.

This invention is particularly adaptable for small engines and obviates many of the problems encountered in prior art examples. This invention provides a nozzle or thrust chamber wall which has a high ratio of thermal conductivity to density such that a heat path is formed from the hottest regions of the engine at or adjacent the throat region upstream to the combustion chamber interior wall. This heat transfer path is formed by combining a material with the aforementioned characteristics with film cooling.

The objects and advantages of the invention will become apparent as this description proceeds taken in conjunction with the drawing in which the figure is a view partially in cross-section of an engine constructed according to this invention and is illustrative of the heat flow obtained during steady state firing.

A thrust chamber assembly is designated generally at 2 and includes an injector 4, a combustion chamber wall 6, a throat forming portion or wall 8 and the remainder of nozzle wall shown at 10. A combustion chamber 12 is formed by wall 6 and a throat 14 by portion 8.

A propellant such as fuel is introduced through passages 16, 18, 20 and 22 into combustion chamber 12. Likewise, a propellant such as an oxidizer is introduced through passages 24, 26 and 28 which impinges on the other propellant for even mixing and combustion. This combustion may be hypergolic or separate means to initiate combustion may be provided such as an igniter, a catalyst or a spark plug. It may be noted that the figure has half of the engine cut away to show the details thereof. Portion 30 is a view of the exterior.

As a preferred embodiment of this invention, interior wall 32 is nickel which is electro-deposited or through other convenient means placed as a layer on the inner wall of portion 34 which is proferably constructed of copper. The chamber may also be constructed by depositing first the nickel and then copper on a removable mandrel. An outer layer of nickel may also be employed for the purpose of improving the radiation of heat externally but is not necessary.

Arrows 36 illustrate the movement of one of the propellants passing through injector passage 16, which, it is noted, does not impinge on another propellant. Thus, this propellant will traverse the interior of wall 6 and 8. This, as so far described, is similar to the conventional film cooling. However, as mentioned previously, conventional film cooling is inadequate due to boil-off when used in conjunction with previously known materials of construction. By providing copper which has a high ratio of thermal conductivity to density, it has been found that heat transfer adjacent the throat region is directed as shown in the direction of arrows 40 back upstream to the interior of wall 6. This heat is then picked up by the propellant flowing in the direction of arrows 36 and absorbed thereby. The nickel layer 32 is provided since copper has a low melting point and at the high temperatures encountered is subjected to erosion and loss of structural integrity. By providing a relatively thin layer or coating of nickel, the heat transfer properties of the layer plays a relatively insignificant role in the total heat transfer.

Dotted lines 42 are illustrative of the temperature plots, and range from approximately 600° F. for an engine fired according to this invention up to approximately 1600° F. which occurs in the throat region. Since heat will flow in a path transverse to the temperature plots, this heat will transfer in the direction of solid lines 40 back to the combustion chamber and, more particularly, to the interior wall thereof where the heat is absorbed by the coolant flowing in the direction of arrows 36.

While this invention is directed to the basic concept of film cooling in conjunction with a mixture having a high ratio of thermal conductivity to density, the preferred material is copper with a layer of nickel thereon. However, other materials which can be utilized with this invention include aluminum and silver in conjunction with a layer such as nickel or stainless steel. Silver, while not possessing the best thermal conductivity to density ratio, can be used. When low temperature combustion occurs, aluminum represents a good material as it has a high thermal conductivity to density ratio.

In operation, a coolant is provided which is usually fuel and is injected through injector passages 16, 18, 20 and 22 into combustion chamber 12. Oxidizer is likewise injected through passages 24, 26 and 28. With the single exception of injector passage 16, the propellants will impinge on each other and undergo combustion. After a given passage of time, the nozzle wall will be heated in the manner similar to that shown in the figure such that heat will flow from the throat region backwards toward the injector where it will be dissipated interiorly of the nozzle wall by absorption into propellant flowing in the direction of arrows 36. While the coolant is described as one of the propellants, a separate coolant may be provided.

By this invention, it can be seen that an engine capable of long duration firing has been described which is not dependent upon complicated cooling methods.

The ratio of thermal conductivity to density is important since the heat transfer phenomena is accomplished due to the high rate of heat conductivity with only a light material. Copper has a density of approximately 550 pounds per cubic foot and a thermal conductivity of approximately 220 B.t.u./ft.$^2$ ° F./ft. This translates into a ratio of thermal conductivity to density of approximately 0.40 disregarding nomenclature. Aluminum has a ratio of 0.68. Therefore, this invention is primarily intended to encompass those materials having a ratio of 0.40 and above although silver, having a ratio of 0.33 is intended to be included.

Thus, it can be seen that by using a material having a high thermal conductivity to density ratio in conjunction with film cooling that an effective manner of cooling the thrust chamber walls during steady state firing has been achieved. It is also pointed out that by transferring the heat back to the interior of the engine that energy lost overboard of the vehicle is minimized. Where erosion of the throat presents a problem, a high temperature resistant insert can be provided at the throat.

Having described this invention with particularity, it is to be understood that it is to be limited only by the scope of the claims appended hereto.

I claim:
1. A primary cooling system for cooling a gas generator comprising;
    a gas generator having a combustion chamber and nozzle joined by a throat portion, the combustion chamber and throat portion consisting essentially of a compact solid metal material having a high ratio of thermal conductivity to density,
    an injector for injecting propellant into the combustion chamber at its upstream end,
    said injector including means for supplying a film of coolant liquid to the interior wall of the combustion chamber in a downstream direction,
    the walls of the combustion chamber and throat portion being of sufficient thickness so that in operation when the liquid film of coolant is being supplied heat paths are formed within the walls, the heat paths extending from the throat portion axially rearwardly toward the upstream end of said chamber through said walls in curved paths to a region upstream of the throat portion adjacent said injector and said interior wall, said upstream region in conjunction with said film cooled wall acting as a heat sink to dissipate heat removed by thermal conduction from the throat portion.

2. The structure according to claim 1 wherein said ratio is above 0.40.

3. The structure according to claim 1 wherein said nozzle wall is constructed of copper with a layer of nickel on the interior thereof.

References Cited
UNITED STATES PATENTS

| | | | |
|---|---|---|---|
| 3,354,651 | 11/1967 | Novotny | 60—258 |
| 2,705,399 | 4/1955 | Allen | 60—39.69 |
| 2,902,823 | 9/1959 | Wagner | 60—39.69 |
| 2,951,336 | 9/1960 | Mueller | 60—260 |
| 2,994,124 | 8/1961 | Denny. | |
| 3,000,184 | 9/1961 | Fish | 60—258 |
| 3,309,026 | 3/1967 | Loprete | 60—263 |

OTHER REFERENCES

Sutton, G. P.: Rocket Propulsion Elements, Wiley, 2nd ed., March 1958, p. 199 relied on.

NASA, TN D-126, October 1959, p. 2. relied on.

MARTIN P. SCHWADRON, *Primary Examiner.*

D. HART, *Assistant Examiner.*

U.S. Cl. X.R.

60—267, 39.66, 265